May 30, 1944.  R. E. REASON  2,349,989
OPTICAL TESTING OR MEASURING APPARATUS
Original Filed June 1, 1938  4 Sheets—Sheet 1
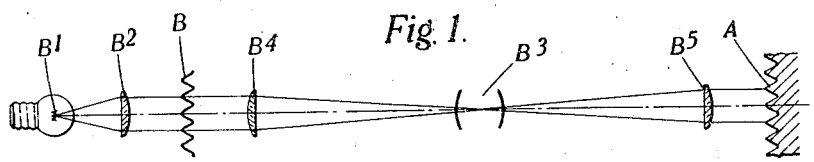
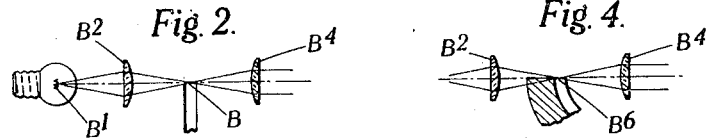 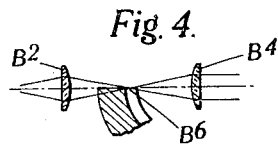
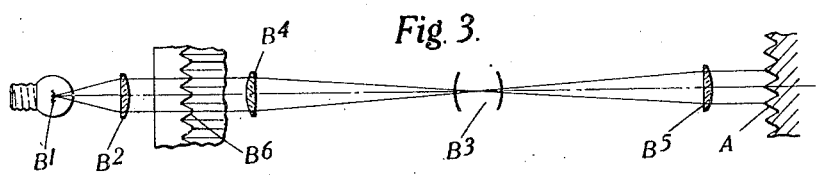
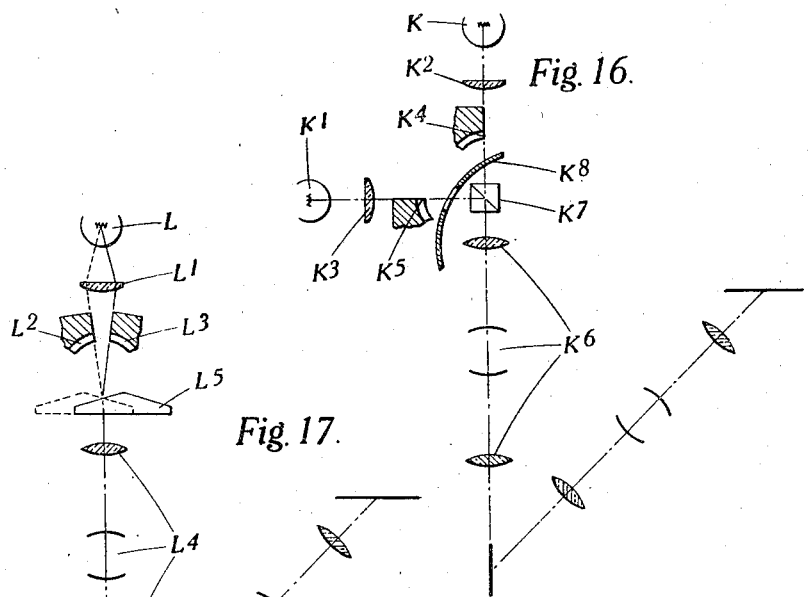
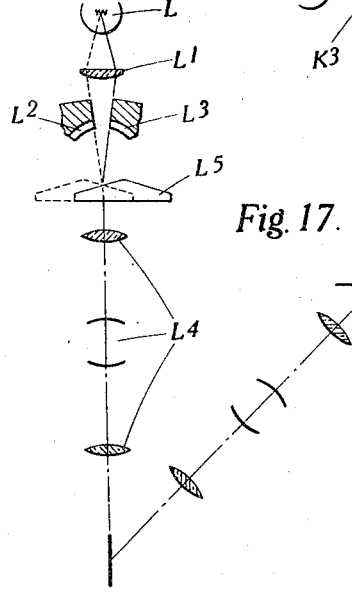
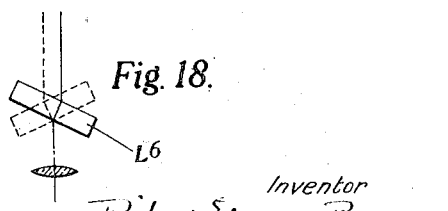
Inventor
Richard Edmund Reason
by Arthur L. Kent
his Attorney May 30, 1944.    R. E. REASON    2,349,989
OPTICAL TESTING OR MEASURING APPARATUS
Original Filed June 1, 1938    4 Sheets-Sheet 2

May 30, 1944. R. E. REASON 2,349,989
OPTICAL TESTING OR MEASURING APPARATUS
Original Filed June 1, 1938   4 Sheets-Sheet 4
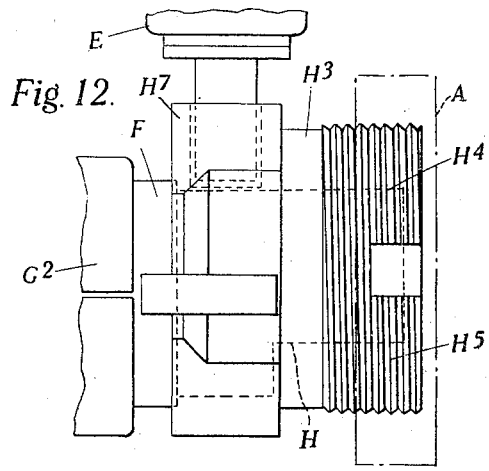
Fig. 12.
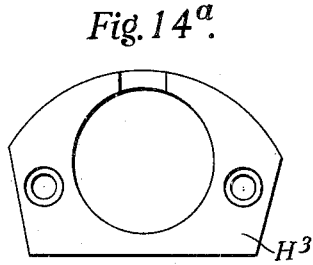
Fig. 14ª.
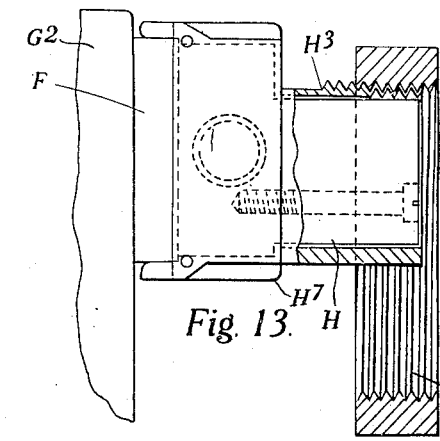
Fig. 13.
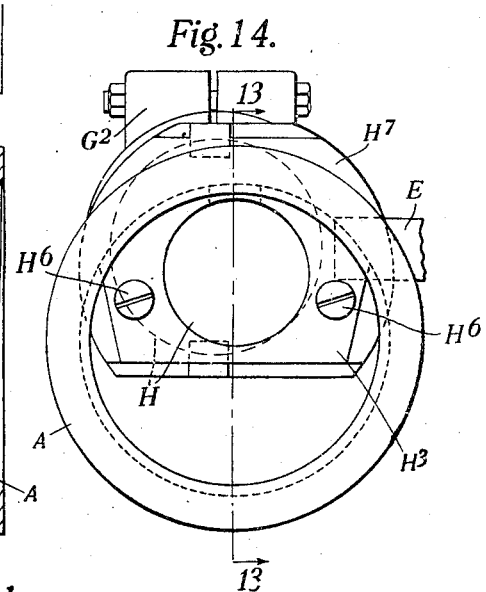
Fig. 14.
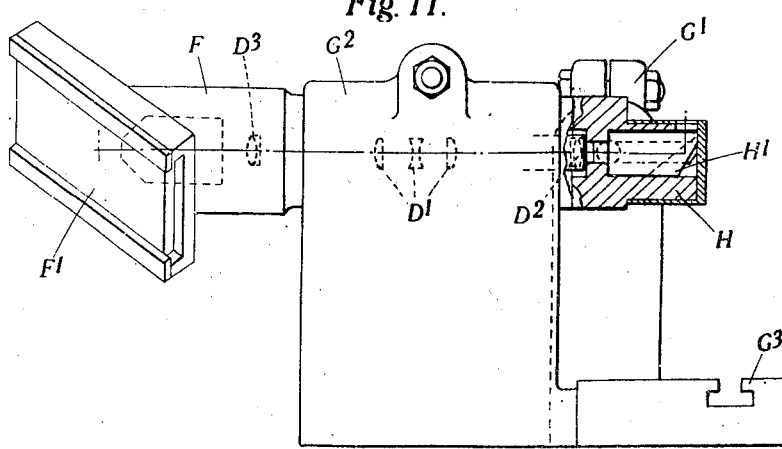
Fig. 11.
Inventor
Richard Edmund
Reason
by
Arthur L. Kent
his Attorney Patented May 30, 1944

2,349,989

UNITED STATES PATENT OFFICE 2,349,989

OPTICAL TESTING OR MEASURING APPARATUS

Richard Edmund Reason, Leicester, England, assignor to Kapella Limited, Leicester, England, a company of Great Britain Original application June 1, 1938, Serial No. 211,231. Divided and this application July 12, 1940, Serial No. 345,079. In Great Britain June 2, 1937

13 Claims. (Cl. 88—14)

This application is divisional from United States of America application Serial No. 211,231 filed June 1, 1938, Patent No. 2,256,102, September 16, 1941. The invention relates to optical apparatus for measuring or testing the accuracy of section profiles, especially plane section profiles, of manufactured articles or of appliances used in their manufacture, as for example for effecting precision measurements of screwthreads or hobs or thread gauges.

The primary object of the invention is to provide an improved optical apparatus for effecting such precision measurement or testing, which will be of more general applicability than the shadow projection arrangements hitherto known for screwthread testing and will effect the desired measurement with a very high degree of accuracy.

A more precise object is to provide apparatus for measuring or testing section profiles of hollow or deeply reentrant objects, such for example as internal screwthreads or nuts, to which the known shadow projection arrangements are inapplicable.

These objects may be fulfilled by the use of apparatus comprising an illuminating device by means of which a beam of light bounded (as least on one side) by a sharply defined surface is directed on to the surface of the object under examination, and an optical projecting device by means of which the diffused light from the surface of the object is utilised for the projection of an image of the profile in which the object is cut by such bounding surface.

A further object of the invention is to provide an improved illuminating device for defining the section profile on the surface of the object with greater accuracy than hitherto.

Figure 7:
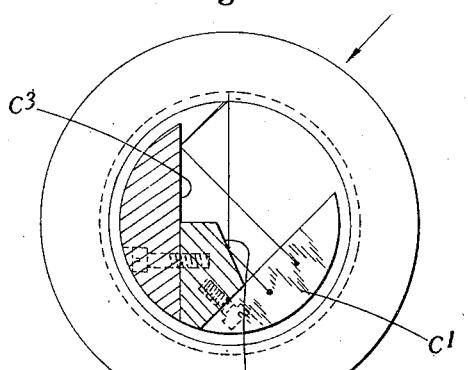
Figure 8:
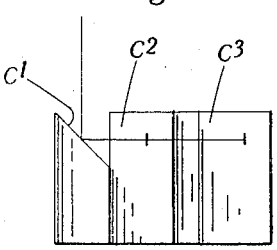
Figure 15:
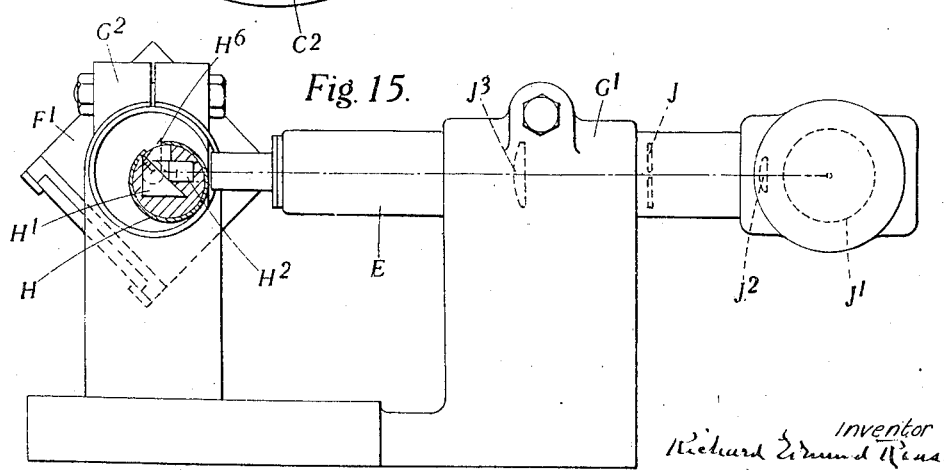
Figure 9:
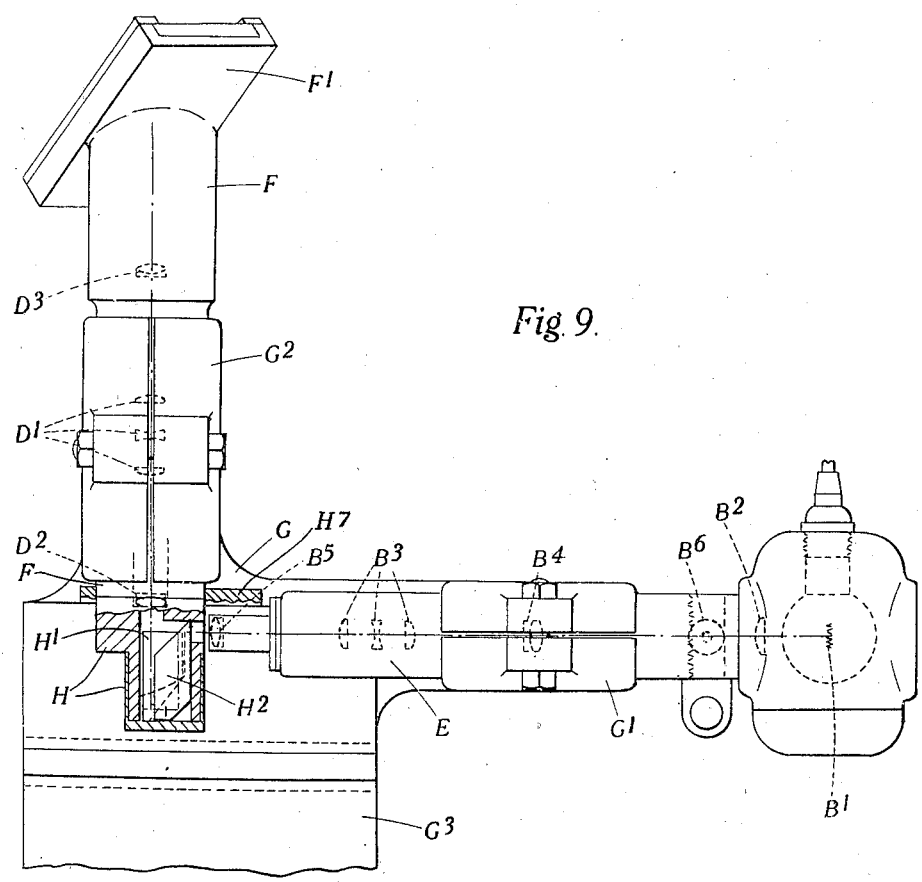
Figure 10:
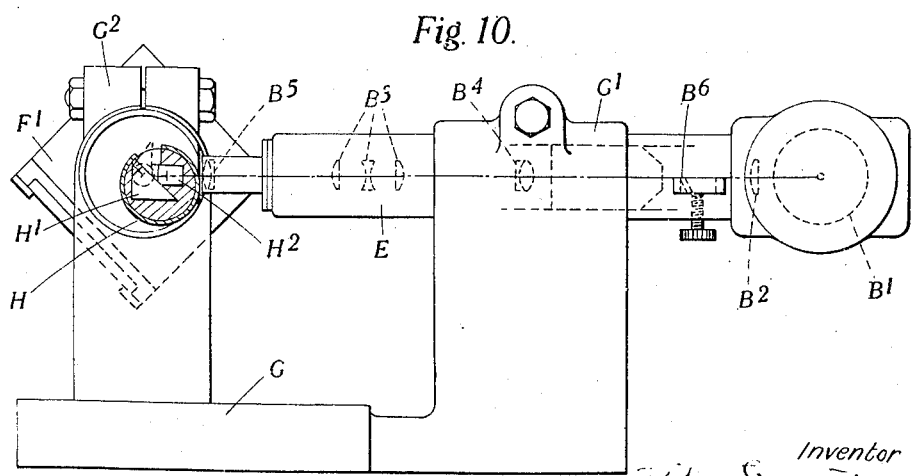

Still further objects of the invention will be apparent from the appended claims and from the following description of the accompanying drawings, which show some convenient practical alternative arrangements according to the invention. In these drawings Figure 1 shows one simple form of illuminating device more especially intended for defining the section profile on a portion of a screwthread, Figure 2 is a partial view of the arrangement of Figure 1 at right angles thereto, Figures 3 and 4 are similar views showing a preferred modification of the arrangement of Figures 1 and 2, Figures 5 and 6 illustrate a simple arrangement embodying the illuminating device of Figures 3 and 4 for examining internal screwthreads, Figures 7 and 8 show a modification of the arrangement of Figures 5 and 6, Figures 9 to 14 illustrate a preferred arrangement, also embodying the illuminating device of Figures 3 and 4, for examining internal screwthreads, Fig. 9 is a plan view of such preferred apparatus partly in section and with certain parts omitted, Fig. 10 is a side elevation partly in section taken from below in Fig. 9, Fig. 11 is a side elevation partly in section looking from the left in Fig. 9, Fig. 12 is a partial plan view on a larger scale showing certain parts omitted from Figs. 9 and 11, Fig. 13 is a side elevation of parts shown in Fig. 12 partly in section on the line 13—13 of Fig. 14 and showing, also, the nut to be examined, which is indicated by dotted lines in Fig. 12, Fig. 14 is a view in elevation looking from the right in Fig. 13, Fig. 14a is a front view of the nut carrier, Figure 15 shows a modification of the arrangement of Figures 9 to 14, Figures 16 and 17 respectively illustrate two alternative illuminating arrangements especially intended for testing the pitch of a screwthread, and Figure 18 shows a modification of the arrangement of Figure 17.

The alternative illuminating devices shown in Figures 1 to 4, as also those of Figures 16 to 18, are intended more especially for use in conjunction with a suitable optical projecting device for projecting an image of the section profile for precision measurement of objects such as screwthreads or gear teeth, wherein it is necessary to take into account the shape of the surface of the object and to define the section profile sharply by means of an illuminating device suited to such shape. A suitable form of projecting device for use with the illuminating device will be described later with reference to Figures 5 to 15.

The arrangement of Figures 1 and 2 is especially intended for illuminating a number of non-collinear parts of the profile, such for example as a series of teeth of a thread A. This arrangement employs a knife edge B shaped approximately to suit the shape of the profile, and an image of the knife edge is focussed by a single optical system on the surface of the object A, the knife edge being illuminated by a source of light $B^1$ of small size associated with a condenser $B^2$, with or without a concave reflector behind the light source, so that a large percentage of the light is collected and concentrated on the projecting lens of the optical system by which the image is focussed on the object surface. Since the individual parts of the knife edge and the profile are inclined to the optical axis of the system, it is preferable to employ a rectifying oblique projecting system to ensure accurate focussing on the object surface, and to this end the optical system $B^3B^4B^5$ is preferably arranged in the manner described in United States of America patent application Serial No. 279,253, which like the present application is divisional from application Serial No. 211,231. Thus the optical system comprises a projecting lens $B^3$ (consisting for example of a divergent component between two convergent components with the modal points in the air gaps between the components) and two collimating lenses $B^4B^5$ spaced apart symmetrically one on either side of the central lens $B^3$. The two collimating lenses $B^4B^5$, each of which may consist of an achromatized doublet, are of equal focal length and have their principal focal points coincident with the nodal points of the central lens $B^3$. The whole system is symmetrical and produces an inverted image at unit magnification, each elementary portion of the knife edge B and the corresponding elementary portion of the image thereof being equally inclined to the optical axis of the system.

In the arrangement of Figures 1 and 2 the knife edge B is made by bending sheet metal to the required shape and cutting it off in a plane. It will be appreciated, however, that the knife edge may be made in other ways, as for example by milling from the solid. Figures 3 and 4 illustrate such a modification, wherein a knife edge is obtained by cutting a solid counterpart $B^6$ which will mate with the object, for example a nut, if the object is a screwthread, in the appropriate plane and polishing the cut surface. This polished surface acts as a reflector to replace the portion of the cone of light which is cut off by the solid body of the cut counterpart $B^6$ and whose loss would tend to cause the formation of an unsatisfactory image of the knife edge on the surface of the object.

It will be noted that, with either form of knife edge, a sharply defined shadow thereof will be cast on the surface of the object, the edge of the shadow constituting the section profile. The diffused light from the surface of the object is used for projecting an image of the section profile, and although it would be preferable to project the image in a direction at right angles to the plane of the profile, this will seldom be practicable, and the projecting device is therefore such as to project obliquely an accurately focussed image of the profile.

When the object to be examined is hollow or deeply reentrant, as in the case for example of a nut or internal screwthread, it is difficult to position the illuminating and projecting devices to give direct illumination and viewing of the section profile. This difficulty can be obviated by the use of reflectors.

Figure 5:
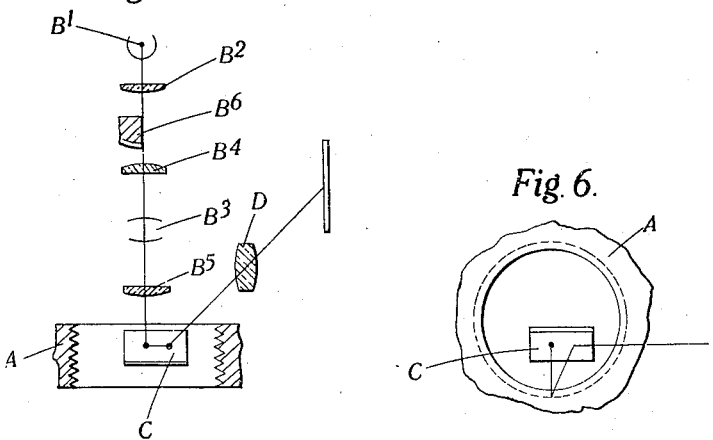
Figure 6:
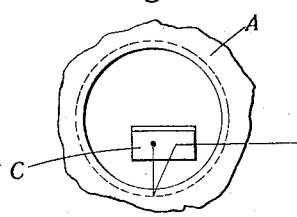

Figures 5 and 6 show one simple arrangement which can be employed when the diameter of the internal thread is relatively large compared with the depth at which it is desired to examine the thread. In this arrangement a small inclined mirror C is mounted within the thread A and serves to reflect both the beam from the illuminating device (which is shown as of the kind described with reference to Figures 3 and 4, the same reference letters being employed) and the beam to the projecting device, the latter beam extending obliquely to the plane of the section profile.

The oblique projecting device may be such as to give an accurately focussed but distorted image of the profile, but it will usually be preferable to employ a device giving a rectified image free from distortion due to the oblique projection. In cases where the direction of projection does not make too large an angle with the perpendicular to the plane of the section profile, say 40° or less, it is possible to obtain fairly good results by using a simple wide angle lens D for projection, as shown in Figure 5, the optical axis of the lens being perpendicular to the section plane (or rather the reflection of the section plane in the mirror C) and also to the image plane, the optical axis however lying to one side of the profile so that the rays pass obliquely through the lens.

In practice the amount of light available will usually be insufficient for satisfactory projection on to a screen and it will consequently often be preferable to record the image photographically on a plate in the image plane.

Figures 7 and 8 show an alternative arrangement of reflectors within the thread A, comprising an inclined mirror $C^1$ for reflecting both the illuminating and the projecting beams, and two further mirrors $C^2$ and $C^3$ parallel to the axis of the thread and respectively for the two beams.

A preferred arrangement for examining internal screwthreads is illustrated in Figures 9 to 14. In this arrangement the illuminating and projecting devices are respectively carried in tubular structures EF supported horizontally at right angles to one another in clamps $G^1G^2$ on a base G which also carries a worktable $G^3$. The illuminating device is shown as similar to that of Figures 3 and 4, the same reference letters being employed and the projecting device is of the kind described in the application Serial No. 279,253 referred to above. Thus the projecting device comprises a projecting lens $D^1$ disposed centrally between two collimating lenses $D^2D^3$, the arrangement being similar to that of the optical system used in the illuminating device. The tubular structure F containing the projecting device is provided with an inclined support $F^1$ for a projection screen or photographic plate.

Detachably mounted at the end of the projector casing F is a prism carrier H containing a pair of prisms $H^1H^2$ of appropriate shapes. Fitting closely around the small end of the prism carrier H is a nut carrier $H^3$ which is secured by screws $H^6$ to a casing $H^7$ mounted at the end of projector casing F. Carrier $H^3$ has a pair of guide rails or supports $H^4H^5$, which are preferably threaded as shown and may for part of their length be joined together to form a single wide rail or support. The nut A to be examined is suspended on the guide rails, so that the part of the nut between the rails is at the proper position relatively to the prisms $H^1H^2$. The threading of the rails facilitates positioning of the nut longitudinally in the desired position for examination. This arrangement can be satisfactorily used for examining nuts of various sizes, but if the rails are threaded, it will be necessary to employ a different nut carrier for each different thread pitch. The passage of the illuminating and projecting beams through the prisms H¹H² will be clear from the drawings, and it will be noticed that the arrangement is suitable for use with internal threads of small diameter relatively to their depth. For clearness of showing of the prism carrier H and its contained prisms, the nut carrier H³ and nut A and casing H⁷ are omitted from Figs. 9 and 11, except for a part of casing H⁷ shown in section in Fig. 9.

Figure 15 illustrates a variant of this arrangement wherein the edge H⁶ of the casing H is formed as a knife edge for use with a collimated beam of light obtained by illuminating a small aperture in a mask J (by means of a source J¹ and condenser J²) at the focus of an objective J³. A beam of parallel light is thus transmitted towards the object and since the knife edge is disposed close to the surface of the internal screwthread, a sharply defined shadow is cast thereon to determine the section profile.

For the measurement or testing of the pitch of a screwthread, two or more turns of the thread may be projected and their axial separation measured on the projected image. It will usually be more accurate, however, to employ what may be termed a "null" method of measurement, by first projecting an image of one tooth and then moving the thread through an axial distance equal to the pitch (or a multiple thereof) until the image of another tooth accurately occupies the same position as the first image. When a photographic plate is used, the plate can be maintained in position during movement of the thread through the correct pitch distance and re-exposed so that the two images are superimposed on the plate, the accuracy of such super-position being a test of the accuracy of the pitch of the thread. It will usually be more satisfactory in this case to reverse the second image, so that the pitch accuracy can be tested in accordance with the accuracy of meshing of the two images. Such image reversal can obviously be obtained by rotating the illuminating device through 180° about its own axis between the two exposures of the plate, so that the body of the knife edge is first on one side and then on the other side of the plane defined by the edge. The same effect can however be obtained without the necessity for rotating the whole illuminating device, and Figures 16 to 18 show some alternative arrangements of illuminating device which may be employed for this purpose.

In the arrangement of Figure 16 a double illuminating device is used comprising two sources of light KK¹, each with a condenser K² or K³ and a knife edge K⁴ or K⁵ shaped to suit the profile of the thread, a single optical system K⁶ being used to focus one or the other of the two knife edges on the surface of the object in a manner analogous to that described with reference to Figures 1 to 4. A semi-transparent reflecting surface K⁷ is provided to enable either knife edge to be imaged by the optical system, and the selection of the knife edge to be used is effected by means of a rotatable shutter K⁸. The arrangement is such that with the shutter in one end position the knife edge K⁴ is operative and one side of the section plane is illuminated, whilst with the shutter in its other end position the knife edge K⁵ is operative and the other side of the section plane is illuminated.

In the arrangement of Figure 17 a single source of light L with its condenser L¹ is used in conjunction with two opposed knife edges L²L³ shaped to suit the thread profile, an optical system L⁴ being used to focus the knife edges on the surface of the object. A sliding double wedge L⁵ of appropriate wedge angle is interposed between the optical system and the knife edges, and the arrangement is such that when one half of the wedge is operative one knife edge determines the section plane, the light between the knife edges illuminating one side of such plane, whilst movement of the wedge gives a displacement equal to the width of the band of light and thus brings the other knife edge image into the section plane with consequent illumination of the other side of such plane. The sliding double wedge may be replaced, as indicated in Figure 18, by a tilting block L⁶, or by any other form of deviator.

It will be appreciated that, although the foregoing arrangements have been described with reference to the examination of internal screwthreads, for which they are more especially intended, they can readily be applied to a variety of other uses.

What I claim as my invention and desire to secure by Letters Patent is:

1. In optical measuring or testing apparatus for examining plane section profiles of objects having non-planar surfaces, the combination of an illuminating device for defining the profile of a plane section of the object under examination such device comprising a plane knife edge shaped to correspond closely to the non-linear shape of the section profile and an optical system for focussing an image of the knife edge on the surface of the object, and means whereby the diffused light from the surface of the object is utilized for the optical projection of an image of the section profile, the optical system being so arranged as to produce a rectified image free from distortion due to the obliquity of parts of the knife edge to the optical axis of the system.

2. In optical measuring or testing apparatus for examining plane section profiles of objects having non-planar surfaces, the combination of an illuminating device for defining on the surface of the object under examination the profile of a plane section thereof, such device comprising a knife edge constituted by the edge of a plane section of a solid counterpart which will mate with the object and an optical system for focussing an image of the knife edge on the surface of the object, and means whereby the diffused light from the surface of the object is utilized for the optical projection of an image of the section profile, the optical system being so arranged as to produce a rectified image free from distortion due to the obliquity of parts of the knife edge to the optical axis of the system.

3. Optical measuring or testing apparatus as claimed in claim 2, in which the section surface of the solid counterpart is polished so as in effect to replace by reflection the portion of the light cut off by the body of the counterpart.

4. In optical measuring or testing apparatus for examining plane section profiles of objects having non-planar surfaces, the combination of an illuminating device for defining on the surface of the object under examination the profile of a plane section thereof, such device comprising a plane knife edge shaped to correspond closely to the non-linear shape of the profile and an optical system for focussing an image of the knife edge on the surface of the object, and an optical projecting device for viewing the profile obliquely to the section plane and projecting an accurately focussed image thereof, the optical system of the illuminating device and the optical projecting device each being so arranged as to produce a rectified image free from distortion even when parts of the profile are oblique to the optical axis.

5. Optical measuring or testing apparatus for examining plane section profiles of objects having non-planar surfaces, comprising an illuminating device for directing on to the surface of the object under examination a beam of light bounded on one side by a plane, such device including at least one knife edge shaped to correspond to the non-linear shape of the profile of the section in which the object is cut by such bounding plane and an optical system for focussing on the surface of the object a rectified image of the knife edge free from distortion due to the obliquity of parts of the knife edge, an optical projecting device for viewing the section profile in a direction oblique to the bounding plane and projecting a rectified image thereof free from distortion due to the oblique projection, and means associated with the illuminating device for transferring the beam of light from one side of the bounding plane to the other.

6. Optical apparatus as claimed in claim 5, in which the knife edge is constituted by the edge of a plane section of a solid counterpart which will mate with the object, the section surface of such counterpart being polished so as in effect to replace by reflection the portion of the light cut off by the body of the counterpart.

7. Optical measuring or testing apparatus as claimed in claim 1, in which the optical system comprises a projecting lens symmetrically disposed between two collimating lenses, and is arranged to give unit magnification and to collimate the principal rays in its object and image spaces.

8. Optical measuring or testing apparatus as claimed in claim 4, in which the optical systems of the illuminating device and the optical projecting device each comprise a system of lenses giving unit magnification and arranged to collimate the principal rays in the object and image spaces.

9. Optical measuring or testing apparatus, comprising an illuminating device for directing on to the surface of the object under examination a beam of light bounded on one side by a plane, such device including two knife edges along which light is caused to pass, and a partially transparent reflector so disposed that the image of one knife edge coincides with but is oppositely directed to the other knife edge, an optical projecting device for utilizing the diffused light from the surface of the object to project an image of the profile of the section in which the object is cut by the bounding plane of the illuminating beam, and a movable shutter for selecting either knife edge for use whereby by movement of the shutter the beam of light is transferred from one side to the other of the bounding plane.

10. Optical measuring or testing apparatus for examining plane section profiles of objects having non-planar surfaces, comprising an illuminating device for directing on to the surface of the object a beam of light bounded on one side by a plane and thereby defining the section profile thereon, such device including two knife edges along which light is caused to pass each shaped to correspond closely to the non-linear shape of the section profile, a partially transparent reflector so disposed that the image therein of one knife edge coincides with but is oppositely disposed to the other knife edge, and an optical system for focussing on to the surface of the object a rectified image of either knife edge free from distortion due to the obliquity of parts of the knife edge to the optical axis of the system, a movable shutter for selecting either knife edge for use whereby by movement of the shutter the illuminating beam is transferred from one side to the other of the bounding plane, and an optical projecting device for projecting in a direction oblique to the plane of the section profile an accurately focussed and rectified image of the profile free from distortion due to the oblique projection.

11. Optical measuring or testing apparatus, comprising an illuminating device for directing on to the surface of the object under examination, a beam of light bounded on one side by a plane, such device including two oppositely directed knife edges along which light is caused to pass and a movable deviating device acting in one position to locate the image of one knife edge in the bounding plane and in another position to locate the image of the other knife edge in such plane whereby by movement of the deviating device the beam of light is transferred from one side to the other of the bounding plane, and an optical projecting device for utilizing the diffused light from the surface of the object for projecting an image of the profile of the section in which the object is cut by the bounding plane.

12. Optical measuring or testing apparatus for examining plane section profiles of objects having non-planar surfaces, comprising an illuminating device for directing on to the surface of the object a beam of light bounded on one side by a plane and thereby defining the section profile thereon, such device including two oppositely directed knife edges along which light is caused to pass each shaped to correspond closely to the non-linear shape of the section profile and an optical system for focussing on to the surface of the object a rectified image of either knife edge free from distortion due to the obliquity of parts of the knife edge to the optical axis of the system, a movable deviating device acting in one position to locate the image of one knife edge in the bounding plane and in another position to locate the image of the other knife edge in such plane whereby by movement of the deviating device the beam of the light is transferred from one side to the other of the bounding plane, and an optical projecting device for projecting in a direction oblique to the plane of the section profile an accurately focussed and rectified image of the profile free from distortion due to the oblique projection.

13. Optical apparatus for measuring or testing the accuracy of the profile of a plane section of an internal screw thread, comprising a plane knife edge shaped to correspond closely to the shape of the section profile, means for illuminating the knife edge, an optical system for producing a rectified image of the knife edge free from distortion due to the obliquity of parts of the knife edge to the optical axis of the system, a reflecting device arranged and located so as to deflect the beam from such optical system on to an internal or reentrant surface of said screw thread whereby the image of the knife edge is formed substantially on such surface and defines the section profile thereon, a further reflecting device, and an optical projecting device so arranged and located as to receive from such further reflecting device a reflection of a beam of light proceeding from the section profile in a direction oblique to the section plane and project an accurately focussed and rectified image of the section profile free from distortion due to the oblique projection, and means for holding the screw thread in a predetermined position in which position the reflecting devices are so arranged that parts of the optical axes of the illuminating and projecting beams are substantially parallel to the axis of said screw thread.

RICHARD EDMUND REASON.